United States Patent [19]
Funatsu et al.

[11] Patent Number: 4,810,302
[45] Date of Patent: Mar. 7, 1989

[54] AZO PIGMENT COMPOSITION

[75] Inventors: Takenori Funatsu; Mikio Hayashi; Yoshitaka Ohtomo, all of Fuji, Japan

[73] Assignee: Toyo Ink Manufacturing Co., Ltd., Tokyo, Japan

[21] Appl. No.: 24,911

[22] Filed: Mar. 11, 1987

Related U.S. Application Data

[63] Continuation of Ser. No. 727,228, Apr. 25, 1988, abandoned.

[30] Foreign Application Priority Data

May 11, 1984 [JP] Japan .................................. 59-94324

[51] Int. Cl.$^4$ ............................................. C09B 63/00
[52] U.S. Cl. .................................... 106/402; 106/494
[58] Field of Search ................... 106/309, 288 Q, 402, 106/494; 534/841, 842, 845, 874, 882

[56] References Cited

U.S. PATENT DOCUMENTS 4,334,932  6/1982  Roueche ............................. 524/191
4,491,481  1/1985  Robertson et al. ............. 106/288 Q Primary Examiner—Amelia Burgess Yarbrough
Attorney, Agent, or Firm—Gerald J. Ferguson, Jr.

[57] ABSTRACT

An azo pigment composition suitable for use in a gravure printing ink or paint comprises the following components (I) and (II):

(I): a compound obtained by coupling a diazonium salt of a benzene-type amine, which has a carboxyl group or sulfonic group at the meta or para position with respect to the amino group, and either coupler of beta-naphthol or beta-hydroxynaphtoic acid;

(II): a naphthol-type azo pigment, such as Parmanent Carmine FB (C.I. 12490), Brilliant Fast Scarlet (C.I. 12315), and Lake Red C (C.I. 15585), etc.

The composition does not flocculate pigment particles in a gravure ink or paint during a long period storage.

6 Claims, No Drawings

AZO PIGMENT COMPOSITION

This application is a continuation of Ser. No. 727,228 filed 4-25-85 now abandoned.

BACKGROUND OF THE INVENTION (i) Field of the Invention:

This invention relates to azo pigment compositions which are adapted for use as printing inks or paints having good fluidity, coloring power (color strength), transparency and gloss.

(ii) Description of the Prior Art

Naphthol-type azo pigments have been widely used in the manufacture of printing inks, paints and the like. They are disadvantageous in that during the manufacture or storage of printing inks or paints, solvents and binders contained in the inks or paints are interacted with the pigments, thereby causing undesirable flocculation of pigment particles and growth of crystals. As a result, there arises the serious problem in practical applications that the inks or paints involve an increase of viscosity, and lowerings of coloring power, transparency and gloss.

In order to solve the problem, attempts have been heretofore made including addition of flocculation inhibitors, surface treatment of pigments with various resins or surface active agents, and the like. However, these methods are not necessarily satisfactory for overcoming the disadvantages.

Another method of solving the above problem has been proposed such as, for example, in Japanese Patent Publication No. 44-18588. In this patent, it is stated that printing inks or paints can be kept low in viscosity and can prevent an increase of viscosity during storage when using phthalimidomethylation compounds of naphthol AS compounds and carboxylic acid compounds obtained by hydrolysis of the resulting methylated compounds, sulfonic acid compounds obtained by reaction of naphthol AS compounds with sulfuric acid, or alkaline earth metal salts or organic amine salts thereof. However, this method is not sufficient to solve the above problem.

Japanese Patent Publication No. 55-10630 describes a method of improving recrystallization stability of monoazo pigments in printing inks by way of co-coupling with a coupling component having an acidic group. However, the improvement is not adequate.

SUMMARY OF THE INVENTION

The present inventors have made intensive studies in order to solve the problems of the known art and, as a result, found that the problems can be solved by azo pigment compositions which comprise a compound or a metal or organic amine salt thereof (I), said compound being obtained by coupling a diazo component and a coupler component, said diazo component being a diazonium salt of a benzene-type amine, which has a carboxyl group or sulfonic group at the meta or para position with respect to the amino group, said coupler component being selected from the group consisting of beta-nephthol and beta-hydroxynaphtoic acid; and a naphthol-type azo pigment (II).

The diazonium salts of benzene-type amines which serve as a diazo component for the coupling reaction should have a carboxylic group or sulfonic group at the meta or para position with respect to the amino group of the amines, and hydrogen atoms in the benzene nucleus may be substituted with at least one substituents such as halogen atom, hydroxyl group, nitro group, methyl group, acetylamino group or methoxy group.

The compounds (I) are obtained by coupling the diazonium salts with a coupler which is beta-naphthol or beta-hydroxynaphthoic acid. The compounds (I) may be in the form of metal salts or organic amine salts. The compound (I) is preferably mixed with naphthol-type azo pigments (II) in an amount of from 0.5 to 15 wt % of the pigment (II). Representative of the pigments (II) are naphthol AS azo pigments such as Permanent Carmine FB (C.I. 12490), Brilliant Fast Scarlet (C.I. 12315) and Permanent Red FGR (C.I. 12370), beta-hydroxynaphthoic acid azo pigments such as Brilliant Carmine 6B (C.I. 15850), Watchung Red (C.I. 15865), Bordeaux 10B (C.I. 15880) and beta-naphthol azo pigments such as Lithol Red (C.I. 15630), Lake Red C (C.I. 15585) and Lake Red D (C.I. 15500).

It will be noted that when the carboxylic or sulfonic group is provided at the ortho position, a significant effect of the group cannot be recognized. The reason for this is not clearly known but it is assumed that the effect is much reduced because of the interaction through hydrogen bond between the carboxylic or sulfonic group and, the adjacent azo group or hydroxy group of coupler component.

DETAILED DESCRIPTION OF THE INVENTION AND PREFERRED EMBODIMENTS

The benzene-type amines having a carboxylic or sulfonic group at the meta or para position are known compounds.

Examples of the amines having a carboxylic group include 4-aminobenzoic acid, 3-aminobenzoic acid, 2-hydroxy-3-aminobenzoic acid, 2-hydroxy-5-aminobenzoic acid, 3-amino-4-hydroxybenzoic acid, 3-amino-4methoxybenzoic acid, 3-amino-4-chlorobenzoic acid, 3-chloro-4-aminobenzoic acid, 2-chloro-4-aminobenzoic acid, 3-amino-4-methylbenzoic acid, 2-nitro-4-aminobenzoic acid, 2-nitro-5-aminobenzoic acid, 3-amino-4-acetylaminobenzoic acid, and the like.

On the other hand, examples of the sulfonic group-bearing amines include 3-aminobenzenesulfonic acid, 4-aminobenzenesulfonic acid, 3-amino-4-chlorobenzenesulfonic acid, 2-chloro-5-aminobenzenesulfonic acid, 2,5-dichloro-4-aminobenzenesulfonic acid, 3-amino-4-hydroxybenzenesulfonic acid, 2-hydroxy-5-aminobenzenesulfonic acid, 2-hydroxy-4-aminobenzenesulfonic acid, 2-hydroxy-3-amino-5-chlorobenzenesulfonic acid, 3-methyl- 4-aminobenzenesulfonic acid, 3-amino-4-methylbenzenesulfonic acid, 2-methyl-4-aminobenzenesulfonic acid, 2-methyl-5-aminobenzenesulfonic acid, 2-methyl-3-chloro-5-aminobenzenesulfonic acid, 2-methyl-4-amino-5-hydroxybenzenesulfonic acid, 3-nitro-4-aminobenzenesulfonic acid, 2-nitro-4-aminobenzenesulfonic acid, 3-amino-4-hydroxy-5-nitrobenzenesulfonic acid, 2-hydroxy-3-nitro-5-aminobenzenesulfonic acid, 3-amino-4-methoxybenzenesulfonic acid, 2-methoxy-5-aminobenzenesulfonic acid, 3-methoxy-4-aminobenzenesulfonic acid, 2-methyl-4-amino-5-methoxybenzenesulfonic acid, 2-hydroxy-3-amino-5-methoxybenzenesulfonic acid, 3-acetylamino-5-aminobenzenesulfonic acid, 3-acetylamino-5-amino-6-hydroxybenzenesulfonic acid, and the like.

In the practice of the invention, the carboxylic group should preferably be a free acidic group. However, if compounds having a carboxylic group are soluble in water or water proofing is needed, it is preferred to insolubilize such compounds in the form of metal salts or organic amine salts. In case where the benzene-type amines have a sulfonic group, they are preferably be in the form of metal salts or organic amine salts.

The metal salts may be salts of metals such as aluminium, zinc, manganese and the like. Preferable metals for such salts are alkaline earth metals such as calcium, barium, strontium, and magnesium.

Organic amines are not critical and preferable amines are aliphatic primary amines of the formula, R-NH$_2$, in which R represents an alkyl group having from 8 to 24 carbon atoms. Specific examples of the amines include caprylamine, octylamine, laurylamine, stearylamine, and the like.

These metals or organic amines may be used in theoretical amounts with respect to the acidic group, but may be in excess or in smaller amounts.

The compounds (I) including metal or organic amine salts thereof are prepared in aqueous medium by any known techniques. For instance, a benzene-type amine having a carboxylic or sulfonic group at the meta or para position is first dissolved in water along with compounds including alkali metal hydroxides such as sodium hydroxide, potassium hydroxide and the like, or alkali metal carbonates such as sodium carbonate, potassium carbonate and the like, adding an acid, such as hydrochloric acid, formic acid, acetic acid or the like, to the solution so as to render the mixture acidic, cooling it to a temperature below 5° C., and adding an equimolar amount of sodium nitrite to complete diazonization. On the other hand, beta-naphthol or beta-hydroxynaphthoic acid is separately dissolved in water along with an alkali metal hydroxide or carbonate for use as a coupler component. The diazo solution obtained above is gradually added to the coupler solution to complete the coupling reaction therebetween. Especially, when the acidic group of the benzene-type amine is the carboxylic group, a compound precipitates by rendering the coupling solution acidic and can thus be readily collected. Where the acidic group is the sulfonic group, precipitation by acidification may takes place depending on the position of the sulfonic group and the type of substituent of the benzene-type amine, but part of the resulting compound is in dissolved state. Accordingly, it is favorable that the reaction solution is rendered alkaline and is then insolubilized as a metal or organic amine salt. As a matter of course, the carboxylic group may be similarly converted to a metal or organic amine salt. In order to ensure good filtrability of the resulting compound or to promote the conversion to a metal or organic amine salt, the coupling solution may be heated. Various resins, surface active agents, and other additives may be added to diazo and coupler components before, during and after the coupling reaction.

The thus obtained compound (I) is mixed with a naphthol azo pigment (II) either in the state of slurry or in dried state. This permits arbitrary mixing of the compound (I) and various pigments (II) according to various types of printing inks and paints as desired, and is suited for general purposes. In this sense, this method is very beneficial as an industrial pigment manufacturing method as is different from the following co-coupling method.

The azo pigment composition of the invention may be prepared by a method called "co-coupling technique". In this method, a diazo component of the compound (I) is used for the coupling reaction along with a diazo component of the pigment (II). It will be noted that the composition of the invention may take the form of a mere mixture or a mixed crystal.

The compound (I) is generally used in an amount of 0.5 to 15 wt %, preferably from 1 to 10 wt %, of the naphthol azo pigment (II). Amounts less than 0.5 wt % are unfavorable because of the much reduced effect thereof, whereas amount larger than 15 wt % are disadvantageous in that in the field of inks, for example, an ink of an intended hue cannot be obtained with an attendant problem of bleeding. The naphthol azo pigment (II) and the compound (I) may be mixed during the process of producing printing inks or paints.

When applied as printing inks or paints, the azo pigment composition of the invention is much superior to known azo pigments having no compound (I) and can overcome the defects or problems involved in the known pigments, such as a lowering of coloring power, a change in color tone, opaqueness, poor fluidity, an increasing viscosity and gelation occurring during storage over a long term, and the like. Moreover, if the composition of the invention is applied as aqueous printing inks or aqueous paints, fluidity is improved and an increase of viscosity with time is rarely experienced.

As will be understood from the foregoing, the azo pigment compositions of the invention are very effective especially when used to make printing inks or paints of high quality.

Furthermore, the azo pigment compositions of the invention are used in coloring polyolefines, polyesters or vinyl resins etc.

The present invention is described more particularly by way of examples, which should not be construed as limiting the present invention. In examples, parts and percent are by weight.

EXAMPLE 1

13.7 parts of 4-aminobenzoic acid was agitated along with 300 parts of water and 4 parts of sodium hydroxide at room temperature for 15 minutes and was completely dissolved. To the solution was added 23 parts of 35% hydrochloric acid to render it acidic, followed by adding 150 parts of ice and cooling to a temperature of 0° to 3° C. Thereafter, 7 parts of sodium nitrite dissolved in 50 parts of water was added to the solution, followed by continuing agitation at 5° C. or below for 50 minutes to obtain a diazo component. On the other hand, 14.5 parts of beta-naphthol was agitated along with 500 parts of water, 4.5 parts of sodium hydroxide and 1 part of sodium carbonate at room temperature for 20 minutes and completely dissolved to obtain a coupler component. The diazo component was dropped into the coupler component in 15 minutes, followed by agitating for 1 hour to complete the coupling reaction. The pH of the coupling reaction solution was found to be 9.5. Subsequently, 60 parts of an aqueous 10% calcium chloride was added, followed by heating to 80° C., filtration and washing with water to obtain a calcium salt. The thus obtained salt was dried overnight in a hot air circulation oven at 80° C. to obtain 31 parts of a red compound.

EXAMPLE 2

The general procedure of Example 1 was repeated so as to obtain a strontium salt instead of the calcium salt.

EXAMPLE 3

The general procedure of Example 1 was repeated so as to obtain a manganese salt instead of the calcium salt.

EXAMPLE 4

The general procedure of Example 1 was repeated except that the coupling reaction solution having a pH of 9.5 was adjusted to a pH of 2 by the use of 35% hydrochloric acid, followed by heating to 80° C., filtration, washing with water and drying to obtain 29 parts of a red compound.

EXAMPLE 5

The general procedure of Example 1 was repeated so as to obtain a laurylamine salt instead of the calcium salt.

Azo pigment compositions of the invention in which 7 wt % of each of the compounds obtained in Examples 1 through 5 was mixed with Lake Red C (C.I. 15585), and a known pigment consisting solely of Lake Red C (Comparative Example 1) free of any compound (I) obtained by Examples 1 through 5, were each dispersed in an aqueous flexo vehicle (acrylic resin) by means of a ball mill. Each dispersion had a pigment content of 10%. The dispersions were stored for one month and visually observed, with the result that the dispersions of the invention were much superior in coloring power, gloss, change of color tone, and transparency to the known pigment. As will be seen from Table 1, the initial viscosity and the viscosity after one-month storage of the Lake Red C to which any compound (I) according to Examples 1 through 5 was added, were very good.

EXAMPLE 6

The general procedure of Example 1 was repeated except that 17.2 parts of 3-amino-4-chlorobenzoic acid was used instead of 13.7 parts of 4-aminobenzoic acid, and a barium compound was used, thereby obtained 39 parts of a dried barium salt.

EXAMPLE 7

The general procedure of Example 6 was repeated so as to obtain a magnesium salt instead of the barium salt.

EXAMPLE 8

The general procedure of Example 6 was repeated so as to obtain a free acid instead of the barium salt.

Azo pigment compositions of the invention which were obtained by mixing 5 wt % of each of the compounds prepared in Examples 6 through 8 with Brilliant Carmine 6B (C.I. 15850), and a known pigment consisting solely of Brilliant Carmine 6B (Comparative Example 2) and free of any compounds (I) used in the present invention, were each dispersed in a cyclized rubber-type gravure ink vehicle by means of a ball mill. The dispersion was prepared to have a pigment content of 10%. After one month, the dispersions comprising the azo pigment compositions of the invention were found to be better than the known pigment dispersion with respect to coloring power, change of color tone, gloss and transparency.

As will be seen from Table 2, the initial viscosity and the viscosity after one month storage are better in the inventive azo pigment compositions than in the known pigment.

TABLE 1

| | Change of Viscosity of Lake Red C with Time | | | | | | | | | | | |
|---|---|---|---|---|---|---|---|---|---|---|---|---|
| Number of Revolution of BM type Viscometer | Example 1 | | Example 2 | | Example 3 | | Example 4 | | Example 5 | | Comparative Example 1 | |
| | Initial Viscosity | Viscosity after One Month | Initial Viscosity | Viscosity after One Month | Initial Viscosity | Viscosity after One Month | Initial Viscosity | Viscosity after One Month | Initial Viscosity | Viscosity after One Month | Initial Viscosity | Viscosity after One Month |
| 6 (r.p.m.) | 415 | 575 | 300 | 375 | 390 | 530 | 325 | 550 | 450 | 580 | 630 | 3000 |
| 60 | 295 | 390 | 265 | 270 | 320 | 370 (c.p.s.) | 290 | 380 | 360 | 410 | 420 | 1300 |

TABLE 2

| | Change of Viscosity of Brilliant Carmine 6B with Time | | | | | | | |
|---|---|---|---|---|---|---|---|---|
| Number of Revolutions of BM type Viscometer | Example 6 | | Example 7 | | Example 8 | | Comparative Example 2 | |
| | Initial Viscosity | Viscosity after One Month | Initial Viscosity | Viscosity after One Month | Initial Viscosity | Viscosity after One Month | Initial Viscosity | Viscosity after One Month |
| 6 (r.p.m.) | 1250 | 1550 | 1060 | 1420 | 1440 | 1610 | 2500 | 7400 |
| 60 | 745 | 910 | 720 | 830 (c.p.s.) | 880 | 930 | 950 | 1640 |

The pigment compositions of the invention obtained by mixing 3 wt % of each of the compounds (I) prepared in Examples 1 through 5 with Brilliant Fast Scarlet, a known pigment which is pigment (II) consisting solely of Brilliant Fast Scarlet were each dispersed in a chlorinated rubber type gravure ink vehicle for 1 hour by means of a paint conditioner. The dispersion had a pigment content of 10%. The dispersions comprising the pigment compositions of the invention had better initial viscosity and viscosity after one month than the known pigment, and had better coloring power and transparency, with a less change of color tone.

The general procedure of Examples 1 through 8 was repeated using benzene-type amines and the type of final product indicated in Table 3 below. The resulting azo pigment compositions exhibited good properties when used in combination with any naphthol-type azo pigment compositions and/or various vehicles.

TABLE 3

| Example No. | Benzene-type Amine | Type of Final Product (I) |
|---|---|---|
| 9 | 2-hydroxy-5-aminobenzoic acid | free acid |
| 10 | " | strontium salt |
| 11 | " | barium salt |
| 12 | 2-nitro-4-aminobenzoic acid | zinc salt |

TABLE 3-continued

| Example No. | Benzene-type Amine | Type of Final Product (I) |
|---|---|---|
| 13 | " | calcium salt |
| 14 | " | aluminium salt |
| 15 | 3-amino-4-methoxybenzoic acid | manganese salt |
| 16 | " | free acid |
| 17 | " | strontium salt |
| 18 | 2-methyl-5-aminobenzenesulfonic acid | strontium salt |
| 19 | " | barium salt |
| 20 | " | free acid |
| 21 | 3-nitro-4-aminobenzenesulfonic acid | calcium salt |
| 22 | " | aluminium salt |

COMPARATIVE EXAMPLE 3

The general procedure of Example 17 was repeated except that 13.7 parts of 2-aminobenzoic acid alone was used as the diazo component, thereby obtaining a comparative pigment.

COMPARATIVE EXAMPLE 4

The general procedure of Example 17 was repeated except that 13.7 parts of 2-aminobenzoic acid was used as the diazo component, and 14.1 parts (97.5 mole %) of beta-naphthol and 0.56 part (2.5 mole %) of 2-naphthol-5-sulfonic acid were used as the coupling components, thereby obtaining a comparative pigment.

The pigment compositions obtained by mixing 2.5 wt % of each of the compounds prepared in Example 17 and Comparative Example 3 with Lake Red C, or the pigment composition obtained in Comparative Example 4, were each dispersed in a polyamide and nitro cellulose gravure ink by the use of a paint conditioner. The dispersion had a pigment content of 10%. When the dispersions were allowed to stand for 1 month, the gravure ink using the pigment of Example 17 was better than the inks using the pigments of Comparative Examples 3 and 4 with respect to coloring power and transparency. The initial viscosity and the viscosity after one month were also better.

EXAMPLE 23

13.36 parts (97.5 mole %) of 2-aminobenzoic acid and 0.34 part (2.5 mole %) of 3-aminobenzoic acid were agitated along with 400 parts of water at a normal temperature for 20 minutes to completely dissolve the acids. To the solution was added 12.5 parts of 35% hydrochloric acid to render it acidic, followed by adding 200 parts of ice so as to cool the solution to 0° to 3° C. Thereafter, 7 parts of sodium nitrite dissolved in 50 parts of water was added to the solution, following agitating at temperatures below 5° C. for 30 minutes to obtain a diazo component. On the other hand, 14.5 parts of beta-naphthol was agitated along with 500 parts of water and 4.6 parts of sodium hydroxide at room temperature for 20 minutes and completely dissolved in water, thereby obtaining a coupler component. The diazo component was dropped into the coupler component in 20 minutes, followed by continuing agitation for 1 hour to complete the coupling reaction. Thereafter, the reaction solution was heated to 80° C., to which was added 14.5 parts of barium chloride, followed by agitation for 1 hour, filtration, washing with water, and drying to obtain 34.5 parts of a red pigment composition (co-coupling method). The ratio between compound (I) and Lake Red D in the thus obtained pigment composition was 2.5/97.5.

A test carried out on nitrocellulose-type gravure inks comprising the inventive composition and a known pigment, respectively, revealed that the pigment composition according to Example 23 was superior in any evaluation item of coloring power, transparency and viscosity to Lake Red D (comparative pigment), which was obtained by diazotation by sole use of 2-aminobenxoic acid (without use of 3-aminobenzoic acid) followed by coupling with beta-naphthol.

EXAMPLE 24

A diazo component was prepared in the same manner as in Example 1 using 3-methyl-4-aminobenzenesulfonic acid instead of 4-aminobenzoic acid. Similarly, beta-hydroxynaphthoic acid was used instead of beta-naphthol to obtain a coupler component. Thereafter, the coupling reaction of Example 1 was repeated under pH conditions of 8.5, followed by treating in the same manner as in Example 1 using a solution of a strontium chloride, thereby obtaining 44 parts of a strontium salt in the form of a red pigment.

EXAMPLE 25

The general procedure of Example 24 was repeated so as to obtain a calcium salt instead of the strontium salt.

EXAMPLE 26

The general procedure of Example 24 was repeated so as to obtain a barium salt instead of the strontium salt.

EXAMPLE 27

The general procedure of Example 24 was repeated except that 33 parts of a stearylamine acetate dissolved in water was added instead of the strontium salt, thereby obtaining an organic amine salt.

The pigments prepared in Examples 24 through 27 were each mixed with Brilliant Carmine 6B in an amount of 5%, thereby obtaining pigment compositions of the invention. The pigment compositions of the invention and the known pigment consisting solely of Brilliant Carmine 6B (Comparative Example 5) were each dispersed in a polyamide gravure ink vehicle for 20 hours by the use of a ball mill. Each dispersion had a pigment content of 10%. The dispersions were adjusted to a viscosity sufficient for printing and used for printing. The remaining inks were each allowed to stand for one month and visually observed, with the result that the pigment compositions of the invention were much better than the known pigment with respect to coloring power, change of color tone, and transparency. As will be seen from Table 4, the pigment compositions of the invention had very good viscosities immediately and one month after the preparation.

TABLE 4

Change of Viscosity of Brilliant Carmine 6B with Time

| Number of Revolutions of BM type Viscometer | Example 24 | | Example 25 | | Example 26 | | Example 27 | | Comparative Example 5 | |
|---|---|---|---|---|---|---|---|---|---|---|
| | Initial Viscosity | Viscosity after One Month | Initial Viscosity | Viscosity after One Month | Initial Viscosity | Viscosity after One Month | Initial Viscosity | Viscosity after One Month | Initial Viscosity | Viscosity after One Month |
| 6 (r.p.m.) | 1050 (c.p.s.) | 1150 | 890 | 920 | 1540 | 2030 | 1080 | 1390 | 2560 | 30500 |
| 60 | 520 | 540 | 430 | 450 | 600 | 680 | 530 | 580 | 780 | 5170 |

Pigment compositions of the invention which were obtained by mixing 3% of the pigments prepared in Examples 24 through 27 with a barium salt of Watchung Red, and the known pigment free of any pigments prepared in Examples 24 through 27 were each dispersed in a one-component urethane gravure vehicle for one hour in a paint conditioner. The dispersions had a pigment content of 13%. The pigment compositions of the invention were much better than the known pigment with respect to coloring power and transparency. The pigment compositions of the invention exhibited very good viscosities immediately and one month after the preparation.

EXAMPLE 28

16.7 parts of 3-amino-4-methoxybenzoic acid was heated to 50° C. under agitation along with 400 parts of water and 4 parts of sodium hydroxide and completely dissolved. 23 parts of 35% hydrochloric acid was added to the solution to render it acidic, followed by adding 200 parts of ice to cool the mixture to 0° to 3° C. Subsequently, 7 parts of sodium nitrite dissolved in 50 parts of water was added to the solution, followed by agitating at temperature below 5° C. for 1 hour to obtain a diazo component.

On the other hand, 19 parts of betahydroxynaphthoic acid was agitated at room temperature for 20 minutes along with 1000 parts of water and 9.5 parts of sodium hydroxide and completely dissolved to obtain a coupler component. The diazo component was dropped into the coupler component in 20 minutes, followed by agitating for further one hour to complete the coupling reaction. The reaction solution had a pH of 9.0. Then, 31 parts of barium chloride was added to the solution, followed by heating to 80° C. to obtain a slurry of 51 parts of a pigment.

EXAMPLE 29

A coupling reaction solution with a pH of 9.0 prepared in the same manner as in Example 28 was adjusted to a pH of 1.5 by means of 35% hydrochloric acid, followed by filtration, washing with water, and drying to obtain 36 parts of a red pigment.

EXAMPLE 30

The general procedure of Example 28 was repeated but a strontium salt was obtained instead of the barium salt.

The pigments prepared in Examples 28 through 30 were each mixed with Lake Red C in dried or slurry state in an amount of 7%, thereby obtaining pigment compositions of the invention. The pigment compositions of the invention and the known pigment (consisting solely of Lake Red C) of Comparative Example 6 were each dispersed in a nitro cellulose gravure ink vehicle in a ball mill so that the dispersion had a pigment content of 10%. The resulting dispersions were each allowed to stand for 1 month, from which it was revealed that the pigment compositions of the invention were better than the known pigment with respect to coloring power, change of color tone, and transparency. Table 5 demonstrated that the pigment compositions of the invention had good viscosities immediately and one month after the preparation.

TABLE 5

Change of Viscosity of Lake Red C with Time

| Number of Revolutions of BM type Viscometer | Example 28 | | Example 29 | | Example 30 | | Comparative Example 6 | |
|---|---|---|---|---|---|---|---|---|
| | Initial Viscosity | Viscosity after One Month | Initial Viscosity | Viscosity after One Month | Initial Viscosity | Viscosity after One Month | Initial Viscosity | Viscosity after One Month |
| 6 (r.p.m.) | 450 (c.p.s.) | 620 | 325 | 370 | 290 | 330 | 2900 | 5800 |
| 60 | 340 | 430 | 290 | 310 | 245 | 285 | 1300 | 2550 |

EXAMPLE 31

The general procedure of Example 24 was repeated except that 20.3 parts of 3-amino-4methoxybenzenesulfonic acid was used instead of 18.7 parts of 3-methyl-4-aminobenzenesulfonic acid and a manganese sulfate was used instead of a strontium chloride, and 45.5 parts of a dried manganese salt pigment was obtained.

EXAMPLE 32

The general procedure of Example 31 was repeated except that a laurylamine salt was obtained instead of the manganese salt.

The pigment compositions of the invention obtained by mixing 3% of each of the pigments obtained in Examples 31 and 32 with Permanent Carmine FB, and the known pigment (consinting solely of Permanent Carmine FB) of Comparative Example 7 were each dispersed in an alkyd resin paint vehicle in a paint conditioner so that a content of the pigment was 6%. The dispersions using the pigment compositions of the invention had better viscosities immediately and one month after the preparation than the dispersion using the known pigment, with better coloring power and transparency, and less change of color tone with time.

Examples 33 through 45 are summarized in Table 6 in which the general procedure of Examples 24 through 32 was repeated to obtain compounds (I). The thus obtained compounds exhibited good properties when used in combination with any naphthol type azo pigments and/or various vehicles.

TABLE 3

| Example No. | Benzene-type Amine | Form of Final Product (I) |
| --- | --- | --- |
| 33 | 4-aminobenzenesulfonic acid | strontium salt |
| 34 | " | barium salt |
| 35 | 3-amino-4-chlorobenzenesulfonic acid | manganese salt |
| 36 | 3-amino-4-chlorobenzenesulfonic acid | zinc salt |
| 37 | 3-amino-4-chlorobenzenesulfonic acid | caprylamine salt |
| 38 | 2-methyl-4-amino-5-methyoxy-benzenesulfonic acid | calcium salt |
| 39 | 2-hydroxy-4-aminobenzoic acid | free acid |
| 40 | " | stearylamine salt |
| 41 | 3-amino-4-chlorobenzoic acid | calcium salt |
| 42 | " | free acid |
| 43 | 4-aminobenzoic acid | strontium salt |
| 44 | " | free acid |
| 45 | " | laurylamine salt |

EXAMPLE 46

21 parts (95 mole %) of 2-amino-4-chloro-5ethylbenzenesulfonic acid, 0.9 part (5 mole %) of 2-ethyl-5-aminobenzenesulfonic acid, and 4 parts of sodium hydroxide were agitated at 40° C. for 30 minutes and completely dissolved. 23 parts of 35% hydrochloric acid was added to the solution to render the solution acidic, followed by adding 200 parts of ice in order to cool the solution to 0° to 3° C. Subsequently, 7 parts of sodium nitrite dissolved in 50 parts of water was added to the solution, followed by agitating at temperatures below 5° C. for 1 hour to obtain a diazo component.

On the other hand, 19 parts of beta-hydroxynaphthoic acid was agitated at room temperature for 20 minutes along with 1000 parts of water, 8.5 parts of sodium hydroxide and 4 parts of sodium carbonate, thereby obtaining a coupler component in the form of a solution. The diazo component was dropped into the coupler component in 30 minutes, followed by agitating for further 1 hour to complete the coupling reaction. Thereafter, 60 parts of an aqueous 10% calcium chloride solution was added to the reaction solution, followed by heating to 60° C., filtration, washing with water and drying to obtain 44 parts of a red pigment (co-coupling method).

The ratio between the thus obtained pigment composition (I) and Watchung Red (C.I. 15865), which is a naphthol-type azo pigment (II), was 4.9%.

COMPARATIVE EXAMPLE 8

The general procedure of Example 46 was repeated using, as the diazo component, 22.2 parts of 2-amino-4-chloro-5-methylbenzenesulfonic acid alone, thereby obtaining a pigment.

COMPARATIVE EXAMPLE 9

The general procedure of Example 46 was repeated except that 22.2 parts of 2-amino-4-chloro-5-methylbenzenesulfonic acid alone was used as the diazo component, and 17.8 parts (95 mole %) of betaoxynaphthoic acid and 1 part (5 mole %) of 2-naphthol-3,6-disulfonic acid were used as the coupling component, thereby obtaining a pigment.

The pigments obtained in Example 46 and Comparative examples 8 and 9 were each dispersed in a water-soluble styrene-acrylic acid copolymer varnish in a sand mill so that the dispersion had a pigment content of 15%. Each dispersion used as an aqueous flexo ink was allowed to stand for 1 month. The ink using the pigment of Example 46 was much better than the inks using the pigments of Comparative Examples 8 and 9 with respect to coloring power, change of color tone, and transparency, and were also much better with respect to viscosities immediately and one month after the preparation.

What is claimed is:

1. An azo pigment composition characterized by comprising:
a compound or a metal organic amine salt thereof (I), said compound being obtained by coupling a diazo component and a coupler component, said diazo component being a diazonium salt of a benzene-amine, which has a carboxyl group or sulfonic group at the meta or para position with respect to the amino group, said coupler being selected from the group consisting of beta-naphthol and beta-hydroxynaphtoic acid; and an azo lake pigment (II) which coupler component being selected from the group consisting of beta-naphthol, beta-hydroxynaphtoic acid and naphthol-AS; wherein said compound or salt thereof (I) being contained in an amount of 0.5 to 15 wt % of the azo lake pigment (II).

2. An azo pigment composition according to claim 1, wherein hydrogen atoms in the benzene nucleus of said benzene-amine are substituted with at least one member selected from the group consisting of halogen atom, hydroxyl group, nitro group, methyl group, acetylamino group, and methoxy group.

3. An azo pigment composition according to any of claims 1 wherein the metal salt (I) is a salt of an alkaline earth metal.

4. An azo pigment composition according to any of claims 1, wherein the organic amine salt (I) is a salt of an aliphatic primary amine.

5. An azo pigment composition according to claim 2, wherein the metal salt (I) is a salt of an alkaline earth metal.

6. An azo pigment composition according to claim 2, wherein the organic amine salt (I) is a salt of an aliphatic primary amine.

* * * * *

UNITED STATES PATENT AND TRADEMARK OFFICE
CERTIFICATE OF CORRECTION

PATENT NO. : 4,810,302

DATED : March 7, 1989

INVENTOR(S) : Takenori Funatsu; Mikio Hayashi; and Yoshitaka Ohtomo

It is certified that error appears in the above-identified patent and that said Letters Patent is hereby corrected as shown below:

Column 12, claim 1, line 3, --or-- should be inserted between "metal" and "organic".

Signed and Sealed this

Twenty-sixth Day of December, 1989

Attest:

JEFFREY M. SAMUELS

Attesting Officer     Acting Commissioner of Patents and Trademarks